US011521504B2

(12) United States Patent
Rutkiewicz et al.

(10) Patent No.: US 11,521,504 B2
(45) Date of Patent: Dec. 6, 2022

(54) METHOD AND SYSTEM FOR AIRCRAFT TAXI STRIKE ALERTING

(71) Applicant: Rosemount Aerospace Inc., Burnsville, MN (US)

(72) Inventors: Robert Rutkiewicz, Edina, MN (US); Joseph T. Pesik, Eagan, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 351 days.

(21) Appl. No.: 16/822,999

(22) Filed: Mar. 18, 2020

(65) Prior Publication Data
US 2021/0295723 A1 Sep. 23, 2021

(51) Int. Cl.
| G08G 5/06 | (2006.01) |
| B64D 47/08 | (2006.01) |
| B64F 1/00 | (2006.01) |
| G01J 4/04 | (2006.01) |
| G08G 5/04 | (2006.01) |
| G06V 10/75 | (2022.01) |
| G06V 20/13 | (2022.01) |

(52) U.S. Cl.
CPC ............. *G08G 5/065* (2013.01); *B64D 47/08* (2013.01); *B64F 1/002* (2013.01); *G01J 4/04* (2013.01); *G06V 10/751* (2022.01); *G06V 20/13* (2022.01); *G08G 5/04* (2013.01)

(58) Field of Classification Search
None
See application file for complete search history.

(56) References Cited

U.S. PATENT DOCUMENTS

| 6,650,407 | B2 | 11/2003 | Jamieson et al. | |
| 7,852,462 | B2 | 12/2010 | Breed et al. | |
| 9,325,973 | B1 * | 4/2016 | Hazeghi | H04N 13/296 |
| 10,472,093 | B2 | 11/2019 | Lowe et al. | |
| 10,481,268 | B2 | 11/2019 | Vlaiko et al. | |
| 10,678,053 | B2 * | 6/2020 | Waldern | G02B 27/48 |
| 10,901,310 | B2 * | 1/2021 | Ma | G02F 1/133502 |
| 11,054,728 | B1 * | 7/2021 | Ollila | G02F 1/133365 |

(Continued)

FOREIGN PATENT DOCUMENTS

EP 3392152 A1 10/2018

OTHER PUBLICATIONS

Extended European Search Report dated Jun. 25, 2021, received for corresponding European Application No. 21153985.3, six pages.

*Primary Examiner* — Fekadeselassie Girma
(74) *Attorney, Agent, or Firm* — Kinney & Lange, P.A.

(57) ABSTRACT

Apparatus and associated methods relate to ranging object(s) nearby an aircraft using triangulation. A light projector mounted at a projector location on the aircraft projects pulses of polarized light onto the scene external to the aircraft. The projected pulses of polarized light are polarized in a first polarization state. A camera mounted at a camera location on the aircraft has a shutter synchronized to the projector output pulse and receives a portion of the projected pulses of polarized light reflected by the object(s) in the scene and polarized at a second polarization state orthogonal to the first polarization state. Location(s) and/or range(s) of the object(s) is calculated, based on the projector location, the camera location, and pixel location(s) upon which the portion of light is imaged.

18 Claims, 9 Drawing Sheets

(56) References Cited

U.S. PATENT DOCUMENTS

| | | | |
|---|---|---|---|
| 2006/0132772 A1* | 6/2006 | Maximus | G03B 21/206 |
| | | | 348/E5.143 |
| 2008/0204847 A1* | 8/2008 | Kamm | G02B 27/48 |
| | | | 348/E9.026 |
| 2008/0253265 A1* | 10/2008 | Murata | G11B 7/1353 |
| 2010/0202725 A1* | 8/2010 | Popovich | G02F 1/13731 |
| | | | 385/10 |
| 2014/0022616 A1* | 1/2014 | Popovich | G02F 1/133371 |
| | | | 359/15 |
| 2015/0260510 A1* | 9/2015 | Nakajima | G01B 11/2527 |
| | | | 348/136 |
| 2018/0038685 A1* | 2/2018 | Torri | G01M 17/007 |
| 2018/0113200 A1* | 4/2018 | Steinberg | G01S 7/4814 |
| 2018/0196998 A1* | 7/2018 | Price | G06V 40/172 |
| 2018/0299534 A1 | 10/2018 | LaChappelle et al. | |
| 2018/0373134 A1* | 12/2018 | Takahama | G03B 17/54 |
| 2019/0101381 A1* | 4/2019 | Chen | G01B 11/254 |
| 2019/0116355 A1 | 4/2019 | Schmidt et al. | |
| 2019/0129085 A1* | 5/2019 | Waldern | G02B 27/0944 |
| 2019/0310373 A1* | 10/2019 | Rutkiewicz | B64F 1/002 |
| 2019/0364251 A1* | 11/2019 | Tsubota | G03B 21/2073 |
| 2020/0033713 A1* | 1/2020 | Ma | G02B 5/0205 |
| 2020/0284883 A1* | 9/2020 | Ferreira | G01S 7/4817 |
| 2021/0174127 A1* | 6/2021 | Mihara | G06V 10/10 |

\* cited by examiner

Frame 1

Frame 2

METHOD AND SYSTEM FOR AIRCRAFT TAXI STRIKE ALERTING

BACKGROUND

Each year, significant time and money are lost due to commercial aircraft accidents and incidents during ground operations, of which significant portions occur during taxiing maneuvers. During ground operations, aircraft share the taxiways with other aircraft, fuel vehicles, baggage carrying trains, mobile stairways and many other objects. Aircrafts often taxi to and/or from fixed buildings and other fixed objects. Should an aircraft collide with any of these objects, the aircraft must be repaired and recertified as capable of safe operation. The costs of repair and recertification, as well as the lost opportunity costs associated with the aircraft being unavailable for use can be very expensive.

Pilots are located in a central cockpit where they are well positioned to observe objects that are directly in front of the cabin of the aircraft. Wings extend laterally from the cabin in both directions. Some commercial and some military aircraft have large wingspans, and so the wings on these aircraft laterally extend a great distance from the cabin and are thus positioned behind and out of the field of view of the cabin. Some commercial and some military aircraft have engines that hang below the wings of the aircraft. Pilots, positioned in the cabin, can have difficulty knowing the risk of collisions between the wingtips and/or engines and other objects external to the aircraft. An aircraft on-ground collision alerting system would be useful to survey the area forward and/or aft of the tail, wingtips and/or engines, to detect obstructions in a potential collision path, and to provide visual and audible alerts to the cockpit.

Optical systems that direct light to objects external to the aircraft and then detect light reflected by such external objects can use triangulation to determine a range to or location of these external objects. Various methods can be used to direct such light to the objects external to the aircraft. These methods for directing light can have some stray light misdirected from the intended direction. This stray light also can be reflected by objects external to the aircraft, resulting in detection. Because the range to or location of the external objects is based on the intended direction of the projected beam, detection of light corresponding to the stray portion of the projected beam can result in erroneous range and/or location computation. Because the stray light typically has a very low amplitude, compared with the light directed in the intended direction, reflections by specular objects can be more problematic in that specular objects produce reflections having amplitudes higher that those caused by Lambertian objects. Thus, reducing or eliminating light reflected by specular objects can improve such optical ranging systems.

SUMMARY

Apparatus and associated methods relate to a system for calculating location(s) and/or range(s) of object(s) in a scene external to a vehicle. The system includes a light projector, a polarizing filter, a camera, a controller and an image processor. The light projector is configured to be mounted at a projector location on the vehicle to project pulses of polarized light onto the scene. The polarizing filter is configured to pass light of a detection polarization state orthogonal to the specular-reflection polarization state and to block light of the specular-reflection polarization state, the specular-reflection polarization state being the polarization state of the projected pulses of polarized light reflected by specular objects. The camera has a two-dimensional array of light-sensitive pixels. The camera is configured to be mounted at a camera location on the vehicle to receive light passed through the polarizing filter so as to capture two-dimensional images of the scene. The controller is configured to coordinate the light projector and the camera so that the two-dimensional images of the scene include image data corresponding to a received portion of the projected pulses of polarized light reflected by the scene and passed through the polarizing filter. The image processor is configured to calculate, based on the projector location, the camera location, and the image data, locations(s) and/or range(s) of the object(s) in the scene.

Some embodiments relate to a method for calculating location(s) and/or range(s) of object(s) in a scene external to a vehicle. The method includes projecting, via a light projector mounted at a projector location on the vehicle, pulses of polarized light onto the scene. The method includes polarizing, via a polarizing filter, a received portion of the projected pulses of polarized light reflected by the scene so as to block light of the specular-reflection polarization while passing light of a detection polarization state orthogonal to the specular-reflection polarization state. The specular-reflection polarization state being the polarization state of the projected pulses of polarized light reflected by specular objects. The method includes capturing, via a camera having a two-dimensional array of light-sensitive pixels, two-dimensional images of the scene. The camera is mounted at a camera location on the vehicle to receive light passed through the polarizing filter. The method includes coordinating, via a controller, the light projector and the camera so that the two-dimensional images of the scene include image data corresponding to a received portion of the projected pulses of polarized light reflected by the scene and passed through the polarizing filter. The method also includes calculating, via an image processor, locations(s) and/or range(s) of object(s) in the scene based on the projector location, the camera location, and the image data, locations(s) and/or range(s) of the object(s) in the scene.

DETAILED DESCRIPTION

Figure 1:
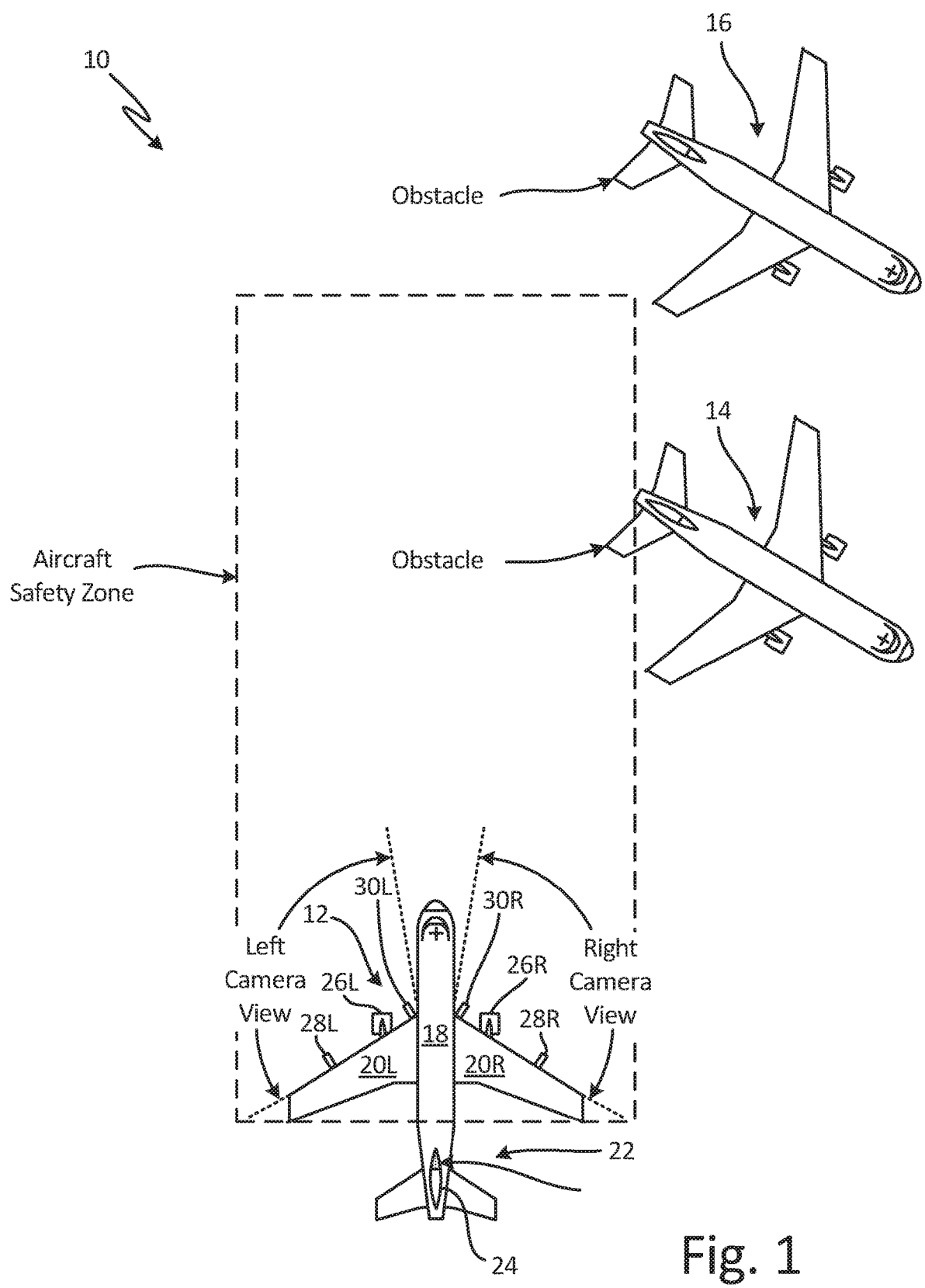
FIG. 1 is a schematic view of an exemplary aircraft collision alerting system used by an aircraft during on-ground operations.

Apparatus and associated methods relate to ranging object(s) nearby an aircraft using triangulation. A light projector mounted at a projector location on the aircraft projects pulses of polarized light onto the scene external to the aircraft. The projected pulses of polarized light are polarized in a first polarization state. A camera mounted at a camera location on the aircraft has a shutter synchronized to the projector output pulse and receives a portion of the projected pulses of polarized light reflected by the object(s) in the scene and polarized at a second polarization state orthogonal to the first polarization state. Location(s) and/or range(s) of the object(s) is calculated, based on the projector location, the camera location, and pixel location(s) upon which the portion of light is imaged.

Location(s) and/or range(s) of the object(s) is calculated using triangulation. Triangulation is a method of determining one or more unknown parameters of a triangle based on other known parameters of the triangle. For example, one can construct a triangle having three vertices defined by: i) the projector location; ii) the camera location; and iii) the object from which the projected pulse of polarized light is reflected. The first two vertices—a projection vertex and a camera vertex—can be known upon installation of the projector and the camera. The location of the third vertex is unknown, but such a location can be determined if the angles corresponding to the first two vertices of the triangle are known.

A projection angle corresponding to a projection vertex defined by the projector location is the angle between the line connecting the projector location and the camera location and a line along which the pulse of polarized light is projected from the projector location to the object from which the light reflects. This projection angle can be known by projecting the light in a single direction, or by projecting a pulse of polarized light having a spatial pattern that provides spatial indicia, which are indicative of the angle corresponding to the projection vertex.

In some embodiments, the pulses of polarized light projected are projected as spatially-patterned light, such as, for example, a linear beam. Such a linear beam can be formed by collimating the projected light in a collimated direction orthogonal to a direction of propagation and diffusing the projected light in a diffusion direction orthogonal to both the collimated direction and the propagation direction. Such a linearly-patterned beam illuminates a distant screen perpendicular to the beam so as to create a line of illumination thereupon. For example, the projected linear beam might create a vertical line on the distant screen, such that the projection angle is approximately equal for each screen reflection along the vertical line. In another example, the projected linear beam might create a horizontal patterned line on the distant screen. In some embodiments, the horizontal patterned line can be encoded with information that is indicative of a relative location along the horizontal line. This relative location along the patterned line can be used to indicate the projection angle corresponding to the projected linear beam at that location along the patterned line.

A detection angle corresponding to a camera vertex defined by the camera location is the angle between the line connecting the projector location and the camera location and a line between the camera location and the object from which of a portion of the projected pulse of polarized light is reflected. This detection angle can be known by if the orientation of the camera is known and the pixel locations upon which such a portion is focused are identified.

The Angle-Side-Angle rule of geometry states that if the side dimension between two vertices is known, as well as the angles corresponding to these same two vertices are known, then all other unknown parameters of the triangle can be computed. For example, the law of sines can be used to compute either (or both) of the two unknown triangle side lengths (e.g., after computing the angle of the third vertex (i.e., an object vertex corresponding to the object from which the projected pulse of polarized light is reflected) by subtracting the angles of the two known vertices from 180°).

Problems can arise from uncertainties of any of the known parameters. For example, uncertainties in the projection angle can cause an error in the calculated location or range of an object from which the pulse of polarized light is reflected. Various things can cause such an uncertainty in the projection angle. For example, if the projected pulse of polarized light has some stray portions that are not directed in the intended projection direction, those stray portions can be projected in a direction not commensurate with the intended projection angle. Any unintended divergence of the projected pulses of polarized light from the intended projection direction can result in errors in the calculated locations or ranges of objects from which these diverged portions of light are reflected.

The optical system can be designed so as to reduce or minimize the stray light directed in unintended directions. Despite this effort, some stray light might still be directed in these unintended directions causing potential errors in calculated ranges or locations of objects. If such stray light is directed upon an object with a specular surface aligned so as to cause specular reflection toward the camera location, this reflected stray light can be imaged by the camera. It is not only mirrors and polished metal surfaces that can cause such specular reflection, but many paint coatings (e.g., license plate coatings) have been developed with micro retroreflectors which can cause reflection of light back toward the projection source with decreasing scattering in directions with increasing differences from this direction. Such retroreflectors can cause a significant portion of the stray light to be directed to the camera location (e.g., especially for distant objects for which the direction to the projection location is little different from the direction to the camera location). Specular reflection of polarized light results in the reflected beam having a polarization state that is determined by the polarization state of the incident beam.

If, however, such stray light is directed upon an object with a Lambertian surface, from which Lambertian reflection occurs, little of the stray light will be directed toward the camera. A Lambertian surface is one in which the surface is matte or a diffusely reflecting surface. The apparent brightness of a Lambertian surface to an observer is nearly the same regardless of the observer's angle of view, because light is reflected in all directions. Because light is directed in all directions from a Lambertian surface, only a very small fraction of stray light is directed to the camera location. Lambertian reflection of polarized light randomizes the polarization such that all polarizations states are reflected in substantially equal proportions.

A polarizing filter(s) can be used to greatly reduce a detection amplitude the portion of the projected light reflected by specular surfaces. The projected beam can be polarized in a first polarization state. This polarization can be performed by the projector (e.g., a laser) or can be performed by directing the projected beam through a polarizing filter. A specular surface will then reflect the polarized projected beam such that the portion reflected has a determined polarization state. A polarizing filter can be positioned in front of the camera lens or aperture. The polarizing filter can be oriented so as to substantially block light that is of the specular-reflection polarization state corresponding to the portion of the projected beam reflected by specular surfaces, and to transmit light polarized in a polarization state orthogonal to the specular-reflection polarization state of the portion of the projected beam reflected by specular surfaces.

Such a configuration of a polarizing filter(s) can reduce the amplitude of signals reflected from Lambertian surfaces as well, as Lambertian surfaces can substantially randomize the polarization of reflected signals. Therefore, approximately half of the photons reflected by Lambertian surfaces will be transmitted through the polarization filter, while the other half of the photons reflected by Lambertian surfaces will be blocked thereby. The reduction of amplitudes of signals reflected from Lambertian surfaces will be much less, however, than the reduction of amplitudes of signals reflected from specular surfaces, as substantially all of the photons reflected from specular surfaces will be blocked by the polarization filter if configured to do so.

FIG. 1 is a schematic view of an exemplary aircraft collision alerting system used by a taxiing aircraft. In FIG. 1, aircraft taxi scenario 10 includes taxiing aircraft 12 and two parked aircraft 14, 16. Taxiing aircraft 12 has cabin 18, wings 20L and 20R, and tail 22. Tail 22 has vertical stabilizer 24. Engine 26L and 26R hang from wings 20L and 20R. Taxiing aircraft 12 is equipped with an aircraft collision alerting system configured to detect objects on both sides of taxiing aircraft 12. The aircraft collision alerting systems includes light projectors 28L and 28R and cameras 30L and 30R. In the depicted embodiment, light projector 28L and camera 30L are both mounted on wing 20L. Light projector 28R and camera 30R are both mounted on wing 20R. Light projectors 28L and 28R are configured to project pulses of polarized light onto a scene external to taxiing aircraft 12, thereby providing illumination of an illuminated portion of the scene. The scene might include objects nearby and external to taxiing aircraft 12. Light projectors 28L and 28R can be mounted at other locations on taxiing aircraft 12 in other embodiments.

Light projectors 28L and 28R include either polarized light sources or random polarization light sources with polarizing lenses configured to polarize the projected pulses of light in a first polarization state. Cameras 30L and 30R include polarizing filters. The polarizing filters of the camera are configured to block portions of the polarized light projected by light projectors 28L and 28R and reflected by specular objects, while passing light polarized in an orthogonal polarization state thereof. Polarization filters of both fixed direction or electronically controlled directions perform the same function. Electronically controlled polarization can provide additional data of the light polarization vector, such as, for example, of a polarization vector corresponding to polarized light reflected by specular surfaces. This additional data can be used to further differentiate between light reflected by specular and Lambertian reflection.

An exemplary embodiment includes locating both a projector and a camera on opposite sides of the cabin of an aircraft. Such a configuration can advantageously reduce the magnitude of external differential motion to which the system is exposed as compared to wing mounted configurations. In some embodiments, however, wing mounted cameras can provide good imagery related to potential hazards for wing and/or collisions.

Light projectors 28L and 28R project the pulses of polarized light in controllable directions of illumination. The projected pulses of polarized light can illuminate objects that reside in these controllable directions of illumination. In the depicted embodiment, light projector 28L is aligned with camera 30L. In some embodiments an optical axis of camera 30L is parallel with a nominal direction of illumination for light projector 28L. In some embodiments, the optical axis of camera 30L and the nominal direction of illumination (e.g., center of the controllable directions of illumination) of light projector 28L are both perpendicular to an axis intersecting each of camera 30L and light projector 28L. In some embodiments, the axis intersecting each of camera 30L and light projector 28L defines an axis of rotation about which the light projector can rotationally control a direction of the projected light. Light projector 28R and camera 30R can be similarly aligned to one another. In some embodiments, each of light projectors 28L and 28R is located on a line that includes a row or column of light-sensitive pixels in a focal plane array of each of cameras 30L and 30R, respectively. In such a configuration, the projected pulses of polarized light can be confined to planes that intercept both light projector 28L or 28R and camera 30L or 30R, respectively. Such a configuration permits coordination of a direction of illumination with an exposure of a row or column of light-sensitive pixels.

Light projectors 28L and 28R are shown illuminating objects that are within an azimuthal range of +/−40 degrees, for example, of the nominal projection direction, and within a controllable directed elevation range of a projection horizon of light projectors 28L and 28R. The elevation range of projection, for example, can be from about +3, +5, +10, +12, or +15 degrees to about −2, −5, −8, or −10 degrees of projection from a vertical location of light projectors 28L and 28R. Such a configuration facilitates detection of objects throughout most of the directions forward taxiing aircraft 12.

In some embodiments, the projected pulses of polarized light can intermittently illuminate objects in the controllable directions of illumination. Such illumination may use light of various wavelengths. For example, in some embodiments, infrared light, being invisible to humans, can be used to provide illumination of objects within the solid angle of illumination. Infrared light can advantageously be nondistractive to pilots and to other people upon whom the pulses of polarized light are projected. In some embodiments, a temporal change in the intensity of the projected pulses of polarized light is controllable. Such temporal changes in the intensity of these projected pulses of polarized light can be controlled, for example, by controlling a rise time and/or a peak power of the illuminating pulses.

In some embodiments, the projected pulses of polarized light can be pulsed for a limited time, with image capture synchronized with the projector pulses of polarized light. In some embodiments, cameras 30L and 38R are synchronized with light projectors 28L and 28R, respectively. In some embodiments, the pulses of polarized light can be encoded in a pattern, such as, for example a linear pattern of a sequence of dashes. In some embodiments, a sequence of projected pulses can be sequentially coded in various dashed-line patterns. Such encoding can facilitate the calculation of location(s) and/or range(s) of object(s) reflecting the pulses of linearly-patterned polarized light thus encoded, as will be described below.

In some embodiments, camera 30L and 30R are also configured with a normal mode in which standard-contrast images are generated. Standard-contrast images are indicative of a measure of integrated light intensity over an exposure time. Each pixel of a focal plane array may generate a word of data indicative of the light intensity integrated over the exposure time. In some embodiments, the word depth can be eight, sixteen, twenty-four, or thirtytwo bits, or other numbers of bits. The larger word depths are capable of providing data indicative of finer resolutions than the smaller word depths. The standard-contrast images can be used in conjunction with the calculated location(s) and/or range(s) of object(s) as will be explained below.

In some embodiments, light having wavelengths within an atmospheric absorption band can be used. Careful selection of projector wavelength can permit light projectors 28L and 28R to compete less with solar energy. There are, however, certain wavelengths where the atmospheric absorption is so great that both projector energy and solar energy are attenuated equally. Light is broadband as emitted from the sun with a maximum intensity falling in the visible light spectrum. Sunlight having wavelengths within the infrared spectrum is of lower intensity than the visible band. And so, projected light having such wavelengths need not compete with the sunlight. Using light having such wavelengths can thereby permit reduced power levels in projecting pulses of polarized light. Atmospheric absorption bands may further reduce solar infrared illumination. For example, atmospheric absorption bands include infrared wavelengths of between about 1.35-1.4, 1.8-1.95, 2.5-2.9, and 5.5-7.2 microns.

The pulses of polarized light that are projected by light projectors 28L and 28R can be identified in images formed by cameras 30L and 30R. Using knowledge of the location from which the pulses of polarized light were projected (e.g., the location of light projectors 28L and 28R), the location of the cameras 30L and 30R and the location within the images (e.g., pixel coordinates) where the feature is imaged can permit location determination using triangulation. For example, light projector 28L can be located at a location on wing 20L of taxiing aircraft 12 that is remote from a location where camera 30L is located. A location of the imaged feature can be used to determine trajectory and/or range data (e.g., distance) to the object(s) from which that specific feature is reflected.

Light projector 28L, for example, can emit a linearly-patterned beam of light to produce a pattern that, when reflected from a reference plane having a normal direction in the plane that contains both the optical axis of camera 30L and the nominal direction of projected light for light projector 28L, is focused upon the array of light-sensitive pixels by camera 30L. One linearly-patterned beam might be projected, at a first projection time, at an angle of elevation of zero degrees (i.e., directed parallel to the horizon). A second structured beam might be projected, at a second projection time, at an angle of negative five degrees from the horizon (i.e., directed at a slightly downward angle about the rotational axis of light projector 28L). When the second structured beam is projected, camera 30L is configured to focus a reflected portion of the projected beam upon the array of light sensitive pixels. In this way, light projector 28L and camera 30L are synchronized so that camera 30L is focusing a portion of linearly-patterned beam upon the sensing array when light projector 28L is projecting the linearly-patterned beam at an elevation or azimuth corresponding to the sensing row or column.

Each of these temporally spaced, projected linearly-patterned beams of light, when reflected from an object, will be focused upon a different row or column of light-sensitive pixels (e.g., different rows or columns will have a different vertical or horizontal pixel coordinates, respectively) of cameras 30L and 30R. Knowing the locations of light projectors 28L and 28R, the locations of cameras 30L and 30R, the specific feature of the projected pulses of linearly-patterned polarized light (e.g., which specific dash of an encoded pattern), and the location within the camera image where the specific feature is imaged can permit a determination of the range of the object from which the specific feature has been reflected.

Using the calculated range information, pilots of taxiing aircraft 12 can be informed of any potential collision hazards within the scene illuminated by light projectors 28L and 28R. Pilots of taxiing aircraft 12 can steer aircraft 12 to avoid wingtip collisions and/or engine collisions based on the trajectory and/or range information that is calculated by the aircraft collision alerting system.

Figure 2:
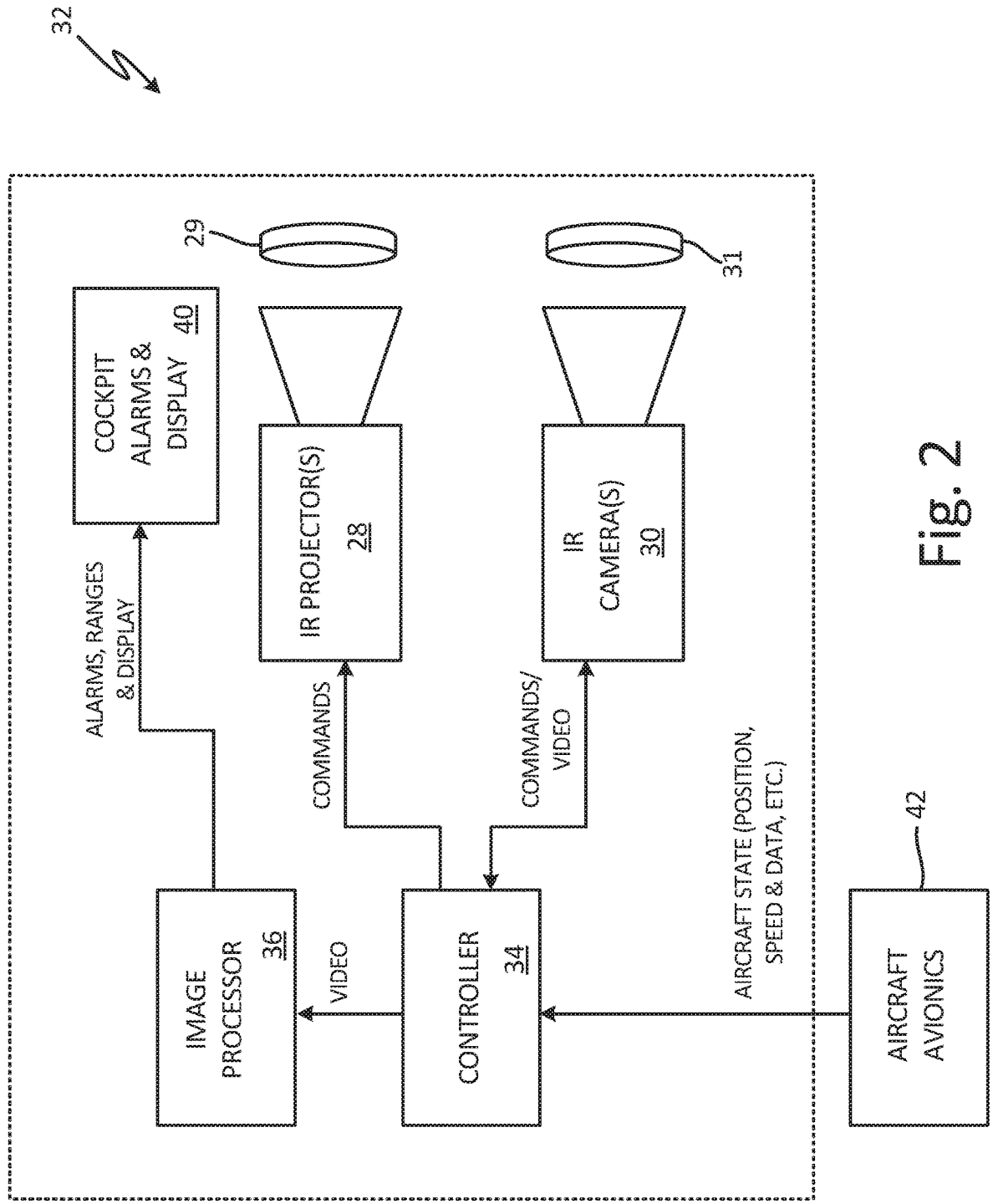
FIG. 2 is a block diagram of an exemplary aircraft collision alerting system.

FIG. 2 is a block diagram of an exemplary aircraft collision alerting system. In FIG. 2, aircraft collision alerting system 32 includes light projector(s) 28, first polarizing filter 29, camera(s) 30, second polarizing filter 31, controller 34, image processor 36, and cockpit alarm and display module 40. Light projector(s) 28 is configured to be mounted at a projector location on an aircraft. Light projector(s) 28 is further configured to project pulses of polarized light from light projector(s) 28 onto a scene external to the aircraft, thereby illuminating a linearly-patterned portion of the scene. In the FIG. 2 embodiment, light projector(s) 28 project pulses of light polarized by first polarizing filter 31 onto the scene in a first polarization state.

Camera(s) 30 is configured to be mounted at one or more camera locations on the aircraft. Camera(s) 30 is further configured to receive light reflected from the scene. Camera(s) 30 is further configured to focus the received light onto a focal plane array comprising a plurality of light-sensitive pixels, thereby forming an image of the scene. The image can include pixel data generated by the plurality of light-sensitive pixels. In the depicted embodiment camera(s) 30 generates an image and a standard-contrast image. Second polarization filter 31 is configured to block portions of the polarized light projected from light projector(s) 28 and reflected by specular objects in the scene, while transmitting light polarized in a polarization state orthogonal thereto.

Controller 34 receives inputs from camera(s) 30 and from aircraft avionics 42. Controller 34 may be a digital processor that generates commands that control the operation of light projector(s) 28 and camera(s) 30. Controller 34 is configured to coordinate light projector(s) 28 and camera(s) 30, so as to control a direction and timing of the projected pulses of polarized light in a direction that is simultaneously imaged by a selected row or column of light-sensitive pixels of the focal plane array of camera(s) 30.

Image processor 36 outputs alarms, calculated ranges of object(s), and images to cockpit alarms and display module 40. Image processor 36 is configured to identify pixel coordinates corresponding to a subset of the plurality of light-sensitive pixels upon which the pulses of polarized light projected by light projector(s) 28 and reflected from the illuminated portion of the scene is focused. Image processor 36 is further configured to use triangulation, based on the projector location of light projector(s) 28, the location(s) of camera(s) 30 and the identified pixel coordinates corresponding to pixels receiving light intensities, to calculate range value data of object(s) in the scene from which the pulses of polarized light projected by light projector(s) 28 is reflected.

Figure 3A:
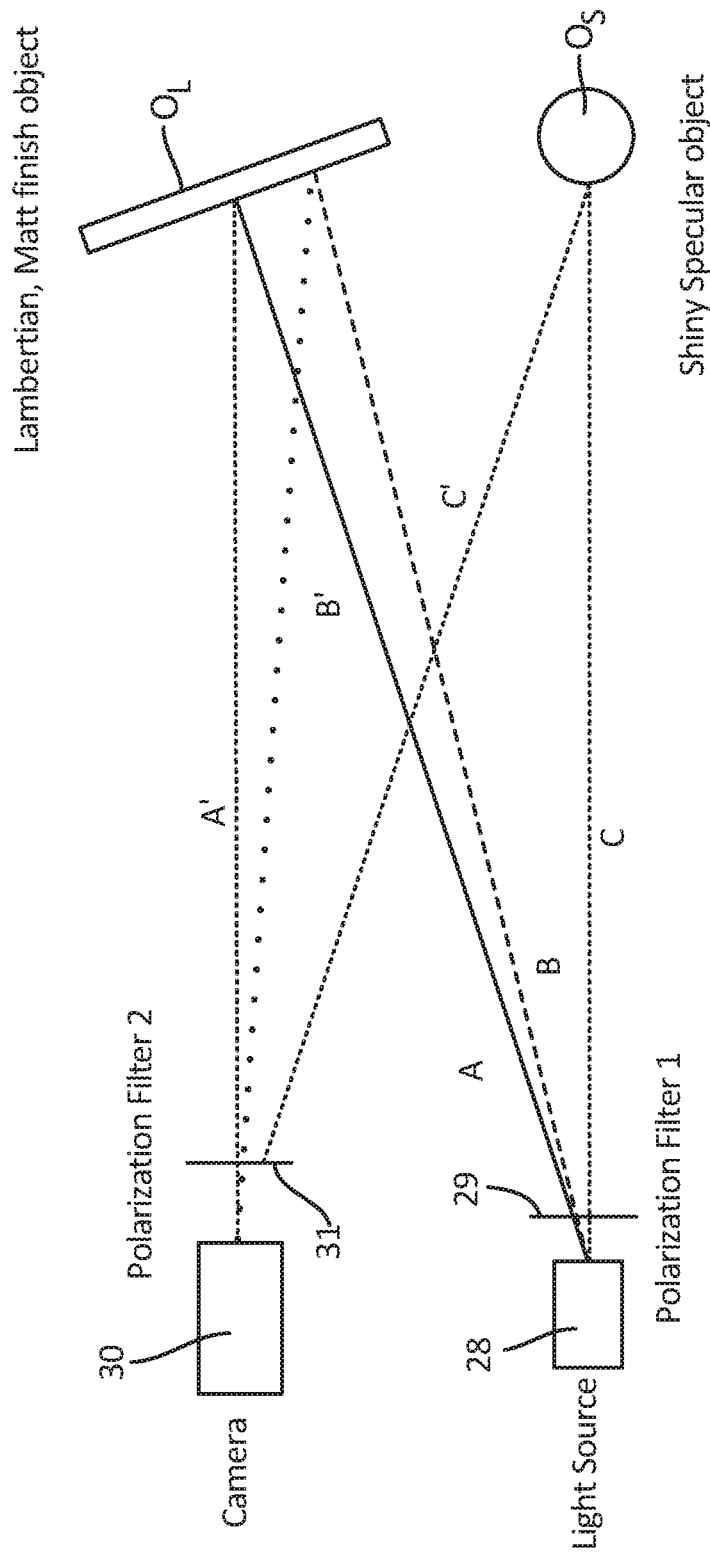
FIGS. 3A and 3B are schematic diagrams depicting how light reflected by specular surfaces is attenuated.
Figure 3B:
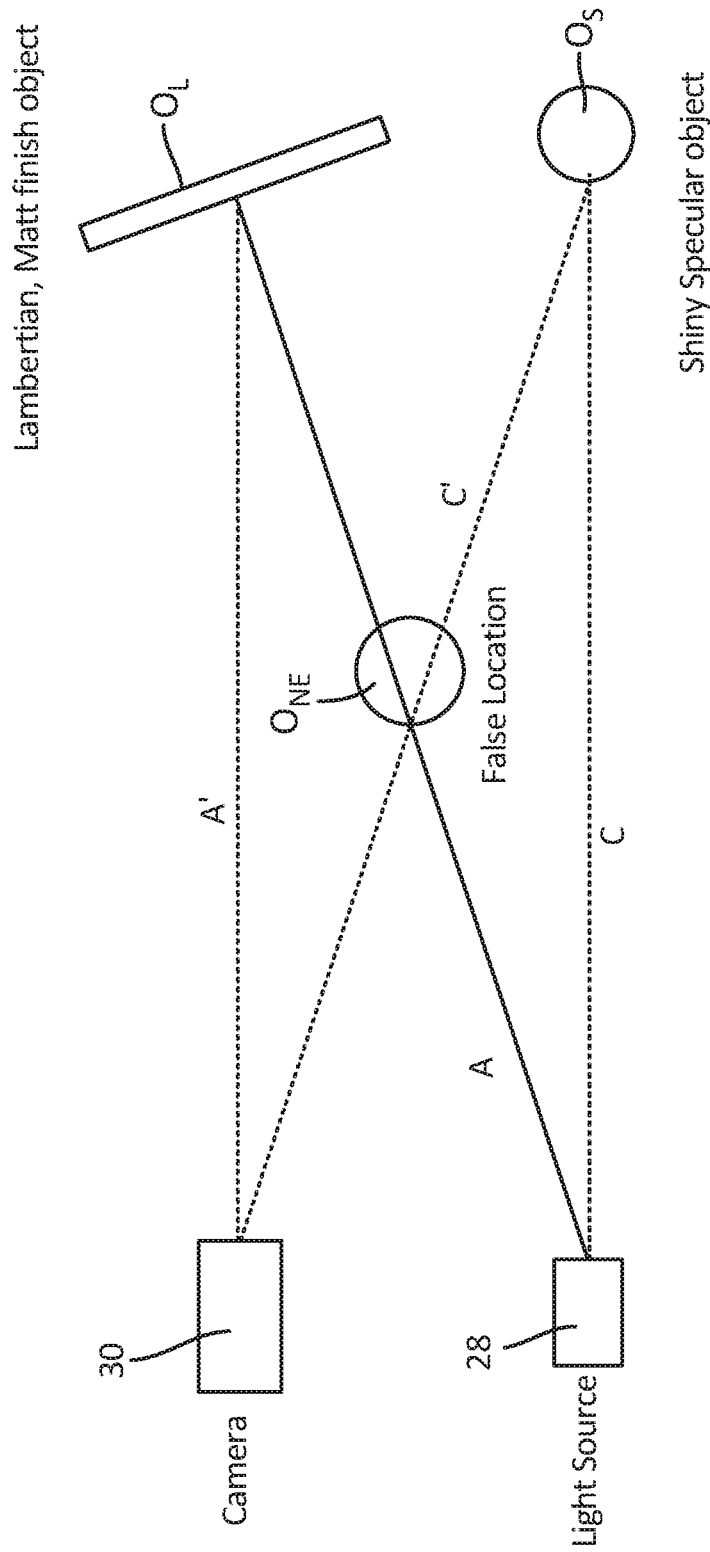

FIGS. 3A and 3B are schematic diagrams depicting how light reflected by specular surfaces is attenuated. In FIG. 3A, light projector 28 is shown projecting a collimated pulse of polarized light (e.g., a collimated pulse of light from a laser). The collimated pulse of polarized light is projected along path A toward Lambertian object $O_L$. The collimated pulse of polarized light is not perfectly collimated, but has some stray portions diverging from path A. Paths B and C represent parts of this stray light. The stray portion directed along path B is reflected by Lambertian object $O_L$—the same object that reflects the main portion of the collimated beam that is directed along path A. The stray portion directed along path C is reflected by specular object $O_S$.

The reflected portions of the projected collimated beam reflected by objects $O_L$ and $O_S$ are directed along paths A', B', and C'. Paths A', B', and C' are the paths of the portions of the projected pulses of polarized light directed along paths A, B, C, and reflected by objects $O_L$ and $O_S$, respectively. The amplitude of the portion of light directed along path A is much greater than the amplitude of the portion of light directed along path B. The amplitude of the portion of light directed along path B is greater than the amplitude of the portion of light directed along path C.

The amplitudes of the portions of the projected light reflect by objects $O_L$ and $O_S$ are directed along paths A', B', and C' is not necessarily proportional to the amplitudes of the light projected along paths A, B, and C. Specular objects, such as object $O_S$, efficiently reflect incident light in specific directions. If the direction of reflection by object $O_S$ is such that the portion reflected is directed to camera 30, then camera 30 will detect a reflected portion having nearly the same amplitude as the amplitude of the incident beam. Lambertian objects, such as object $O_L$, reflected the incident beam over all directions facing away from the plane of the surface. Thus, only a small fraction of the incident beam will be directed toward camera 30.

Because of this difference in the property of reflection between specular and Lambertian surfaces, the stray portion of the projected pulse of polarized light reflected by object $O_S$ along path C' can have nearly as great an amplitude (or even a greater amplitude) than the main portion of the projected pulse of polarized light reflected by object $O_L$ along path A'. Lastly, because the small amplitude of the stray portion of the projected pulse of polarized light reflected by object $O_L$ along path B' is further attenuated in the direction of camera 30 by the dispersion caused by Lambertian reflection, such stray components are typically not problematic in that the signal level is usually too low to be detectable.

In FIG. 3B, light projector 28 is shown projecting a collimated pulse of polarized light (e.g., a collimated pulse of polarized light from a laser). FIG. 3B differs from FIG. 3A in that only paths A, C, A', and C' are depicted. Furthermore, because the main beam is directed along path A, the stray portion of the projected beam reflected by object $O_S$ along path C' can be interpreted as being reflected by an non-existent object $O_{NE}$ located at the intersection of paths A and C'. Thus, the system will erroneously determine that object $O_S$ is located at the false location of the intersection of paths A and C'. This erroneous interpretation of the signal reflected along path C' arises because the system calculates the object position based on an assumption that the pulse of polarized light was projected along path A. Thus, the error arises from an erroneous projection angle, and not an erroneous detection angle. The use of polarizing filters configured to reduce or minimize detection of light reflected by specular surfaces can reduce or eliminate such errors.

In various embodiments, various structured light configurations can be used to illuminate objects external to the taxiing aircraft. For example, in some embodiments, a collimated beam, such as can be generated by a laser, can be scanned (e.g., in raster fashion) in two dimensions. In other embodiments, the beam can be collimated in one dimension orthogonal to the direction of projection and diverged in a direction orthogonal to both the collimated direction and the direction of projection. Such a linearly-structured beam is configured to generate a line of illumination across the objects in the scene. In some embodiments, this line of illumination will be substantially horizontal, and in other embodiments, this line of illumination can be substantially vertical. The beam can then be scanned in a direction orthogonal to the orientation of the illuminated line. In still other embodiments, a two-dimensional structure of illumination, such as a cross-hatch of vertical and horizontal lines, can be generated.

In various embodiments, various ways of coordinating the projection of the pulses of polarized light and the capture of image data can be performed. For example, the camera shutter can be synchronized to the projection of pulses of polarized light. In some embodiments, a rolling shutter, in which successive rows or columns of pixels can be activated in coordination with a line of illumination directed such that the portion of the pulses of polarized light reflected by objects in the scene is focused upon the activated row or column of pixels.

Figure 4:
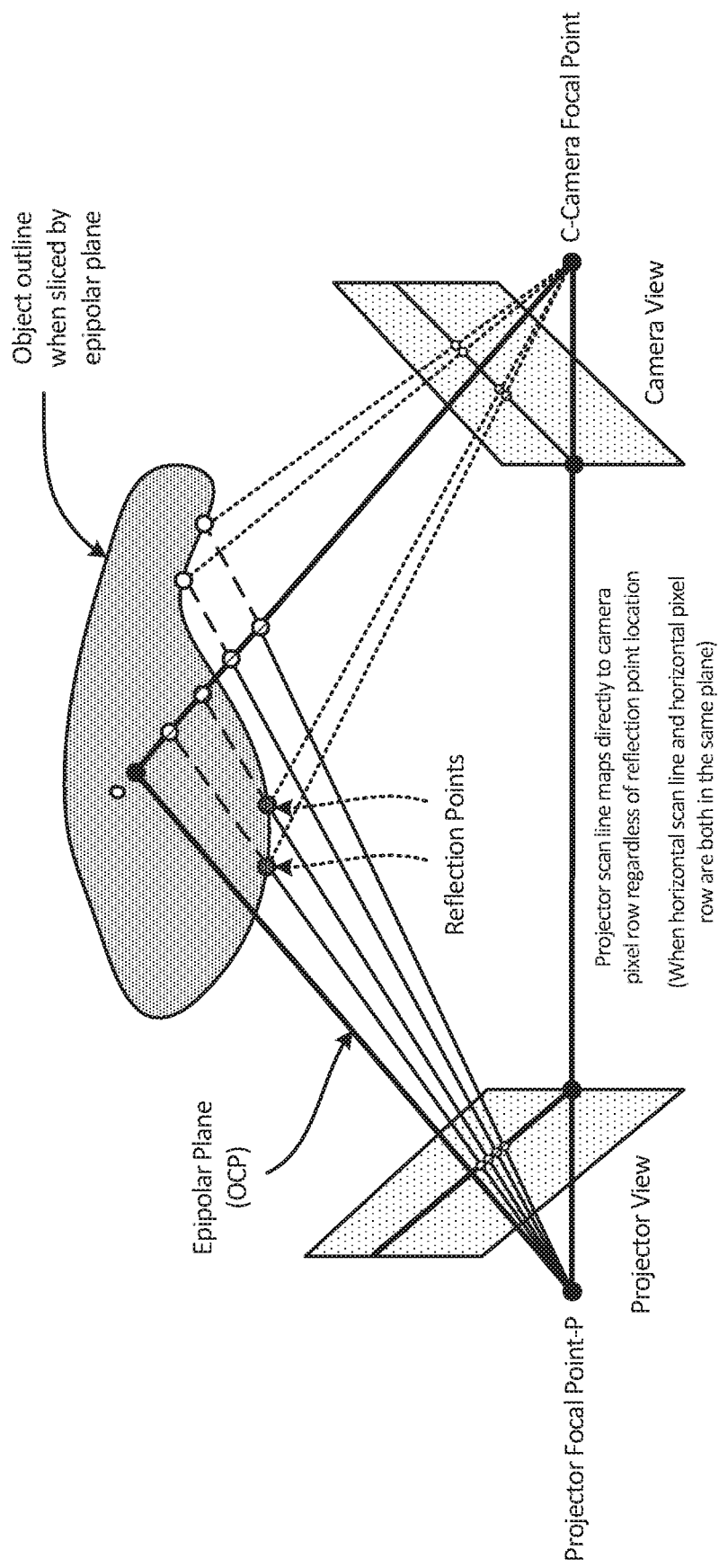
FIG. 4 is a schematic diagram of the epipolar configuration of an object, a light projector and a camera.

FIG. 4 is a schematic diagram of the epipolar configuration of an object, a light projector and a rolling shutter camera. In FIG. 4, light projector 28 projects a linearly-patterned beam upon a surface of an object, thereby forming an illuminated line thereon. The linearly-projected beam is reflected by the object and imaged by camera 30. Camera 30 is configured to capture the reflected linearly-patterned beam by obtaining the pixel data from a row or column that is geometrically aligned to the reflected linearly-patterned beam. An epipolar plane is defined so as to include the illuminated line, light projector 28 and the sensing row or column of camera 30. The system coordinates the sensing row and/or column with an azimuth and/or elevation of the linearly-patterned beam projected by light projector 28.

In some embodiments the camera is operated using a rolling-mode shutter, in which a single row or column is exposed for a time period. Then another single row or column is exposed for another time period. The projection of pulses of linearly-patterned polarized light can be synchronized with the exposure of a corresponding row or column of light-sensitive pixels using such a rolling-mode shutter. The pulse of linearly-patterned polarized light is projected upon the scene in a direction that results in reflections from the scene that are focused upon the row or column being exposed. Exposing only the row or column upon which the projected pulse of linearly-patterned polarized light is focused minimizes the power consumption, by minimizing the number of pixels requiring processing and by minimizing the projector energy required for a specified signal-to-noise ratio.

A two-dimensional image can be created by abutting a sequence of row or column images. A two-dimensional standard-contrast image in which light is integrated over an exposure time can be generated. Such a standard-contrast image can be used in conjunction with the sequence of row or column images that capture the reflected pulses of linearly-patterned polarized light. The standard-contrast images can be displayed on a cockpit display device and annotated with location(s) and/or range(s) of objects external to the aircraft as calculated by the row or column image data. Standard images can be used in conjunction with the images to identify pixel boundaries of the object and to calculate range values of portions of the object corresponding to pixels imaging the linearly-patterned polarized light projected onto the scene.

In some embodiments, rows or columns of image data are captured both with and without pulsed illumination by the linearly-patterned polarized light. A difference between these two images can be used to help isolate the reflections of the linearly-patterned polarized light, by removing persistent sources of light (e.g., a flashing beacon). For pixels imaging reflections of the linearly-patterned polarized light, triangulation can be used to calculate range. For pixels not imaging reflections of the linearly-patterned polarized light, range can be calculated using one or more calculated ranges corresponding to nearby pixels imaging the linearly-patterned light reflected from the object. Using these two ranging techniques provides pixel level resolution of trajectory and/or range data, while requiring only sparse illumination of objects by linearly-patterned polarized light.

Figure 5:
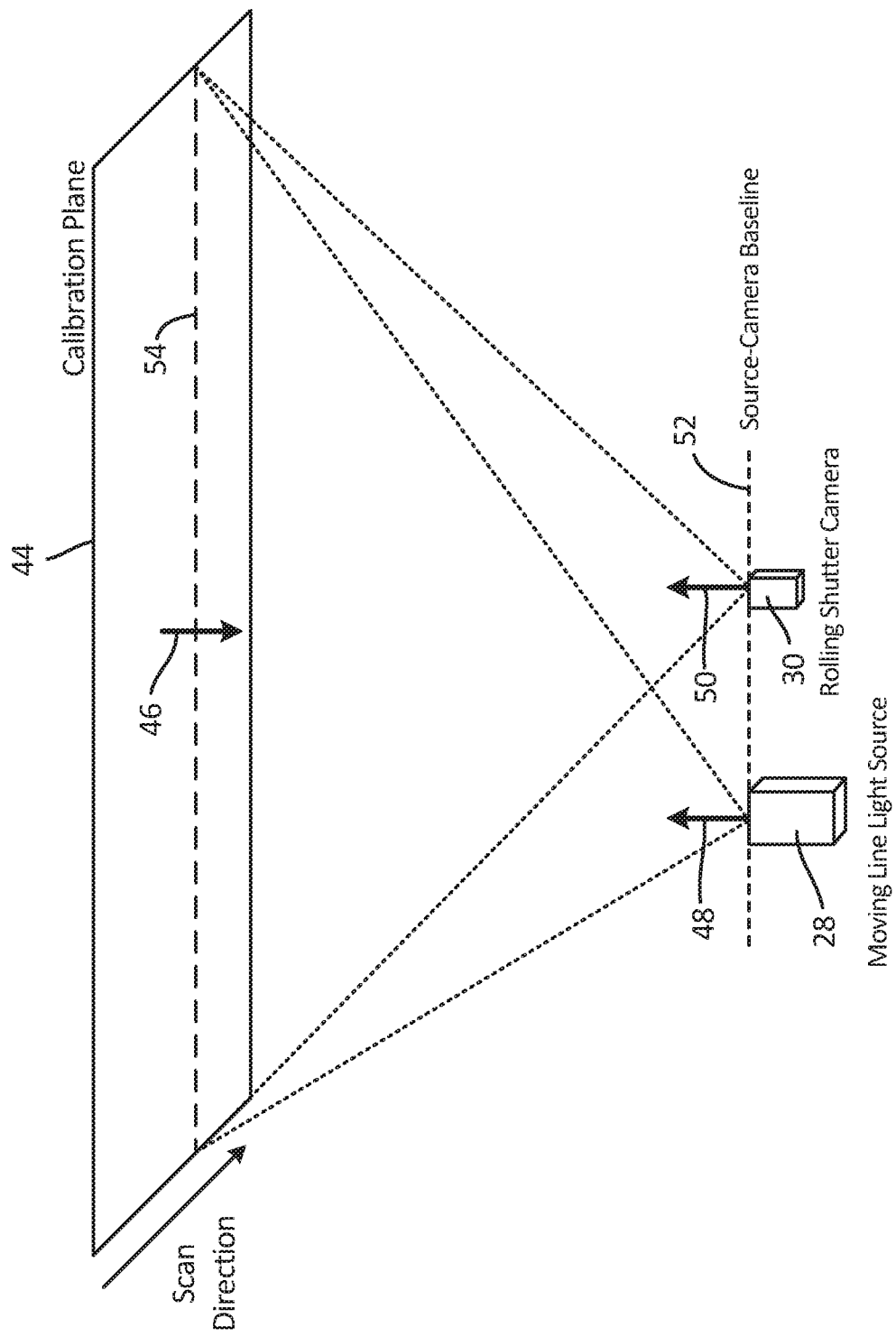
FIG. 5 is a schematic diagram of a light projector projecting a pulse of linearly-patterned polarized light upon a reference plane.

FIG. 5 is a schematic diagram of a light projector projecting a pulse of linearly-patterned polarized light upon a reference plane. In FIG. 5, light projector 28 is shown projecting a pulse of linearly-patterned polarized light upon reference plane 44. Reference plane 44 is aligned such that normal vector 46 of reference plane 44 is parallel (e.g., or anti-parallel) to nominal direction vector 48 of light projector 28 and optical axis 50 of rolling shutter camera 30. Rolling shutter camera 30 and light projector 28 are aligned on source-camera baseline 52. The projected pulse of linearly-patterned polarized light appears as reflected line 54 on reference plane 44. Rolling shutter camera 30 is synchronized with light projector 28 such that reflected line 54 is imaged by a selected row or column of light-sensitive pixels of a focal plane array of rolling shutter camera 30. Light projector 28 and rolling shutter camera 30 can be coordinated so as to sequentially capture row and or column image data for a sequence of projected pulses of linearly-patterned polarized light scanned in a manner so as to generate two-dimensional image data.

Figure 6A:
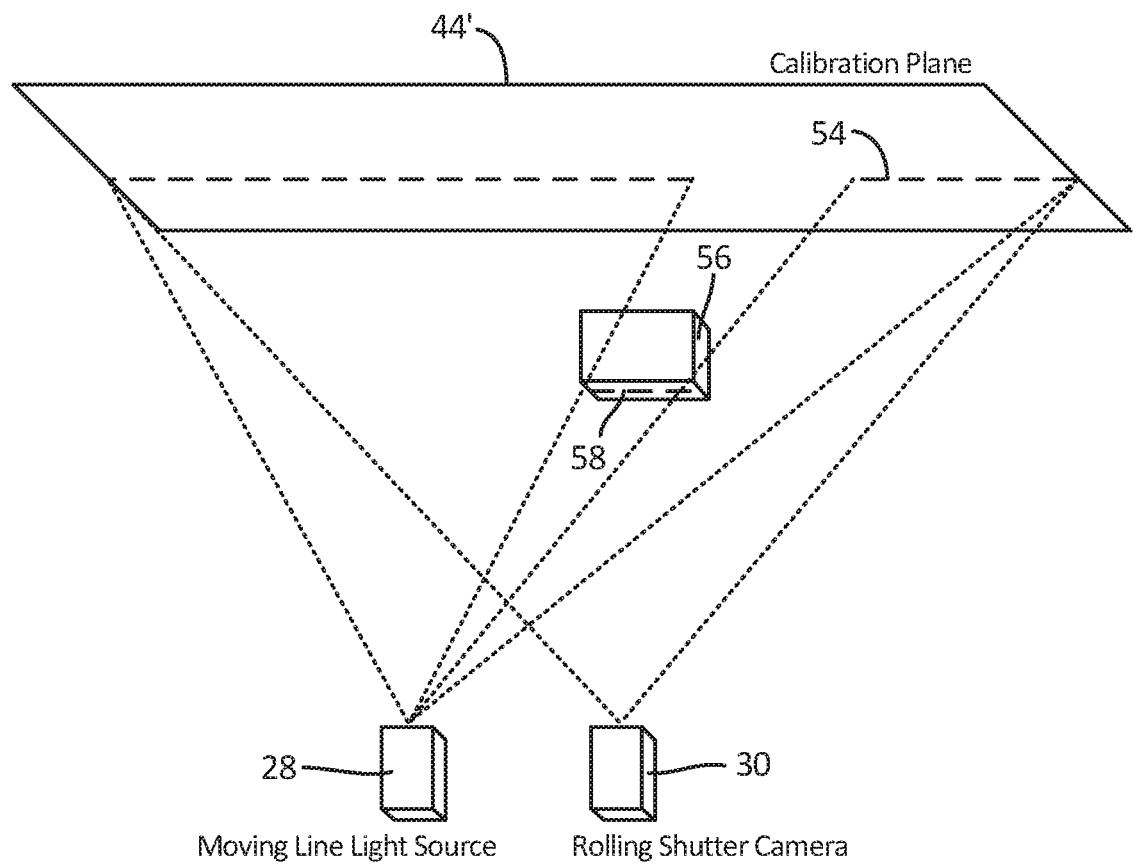
FIGS. 6A and 6B are schematic diagrams depicting a camera selectively capturing a row of image data.
Figure 6B:
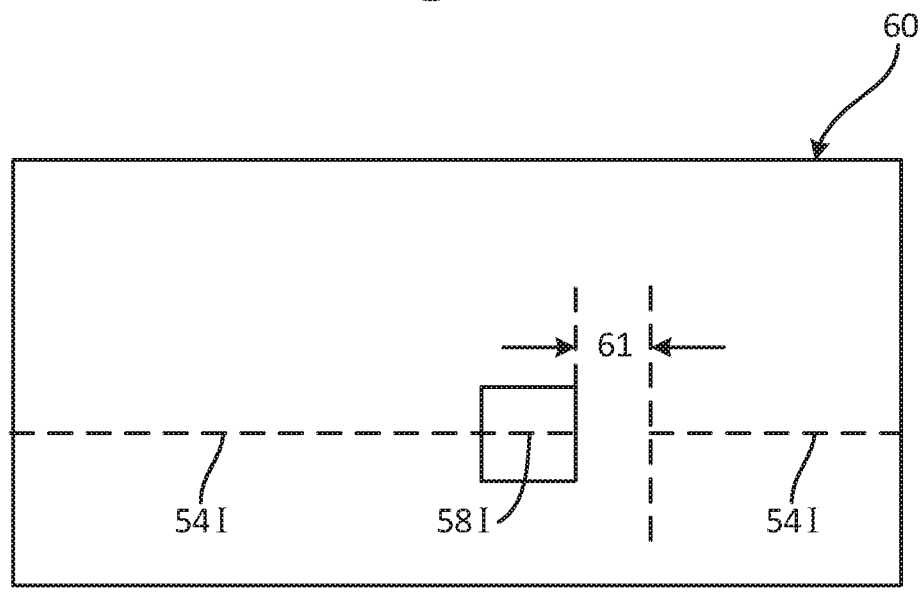

FIGS. 6A and 6B are schematic diagrams depicting a camera selectively capturing a row of image data. In FIGS. 6A and 6B, light projector 28 is shown projecting a pulse of linearly-patterned polarized light upon reference plane 44 and on object 56 between reference plane 44 and light projector 28. The projected pulse of linearly-patterned polarized light appears as reflected line 54 on reference plane 44 and as reflected line 58 on object 56. Rolling shutter camera 30 is synchronized with light projector 28 such reflected lines 54 and 58 are imaged by a single selected row or column of light-sensitive pixels of a focal plane array of rolling shutter camera 30.

Two-dimensional image 60 of reference plane 44 includes image data 541 and 581 from a selected one of the rows or columns of light-sensitive pixels upon which reflected lines 54 and 58 are focused. Because of the specific configuration of light projector 28, rolling shutter camera 30, reference plane 44 and object 58, image data 541 and 581 include a gap in the imaged line. A gap dimension 60 is indicative of the location(s) and/or range(s) of reference plane 44 and object 56. If, for example, reference plane 44 were located at an infinite distance from light projector 28 and rolling shutter camera 30, then gap dimension 60 would be incapable of providing a location and/or range of object 58 alone. To facilitate calculation of location(s) and/or range(s) of object(s), without employing a reflective reference plane, the pulses of linearly-patterned polarized light can be encoded using, for example, spatially patterned sequences of intensity variation.

Figure 7A:
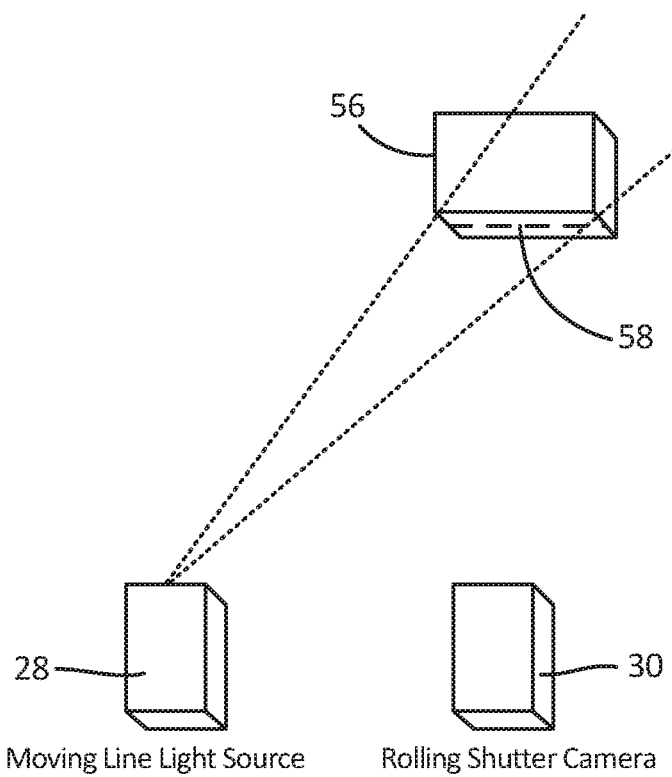
FIGS. 7A and 7B is a schematic diagram depicting light projector projecting a pulse of linearly-patterned polarized light with a dashed encoding pattern.
Figure 7B:
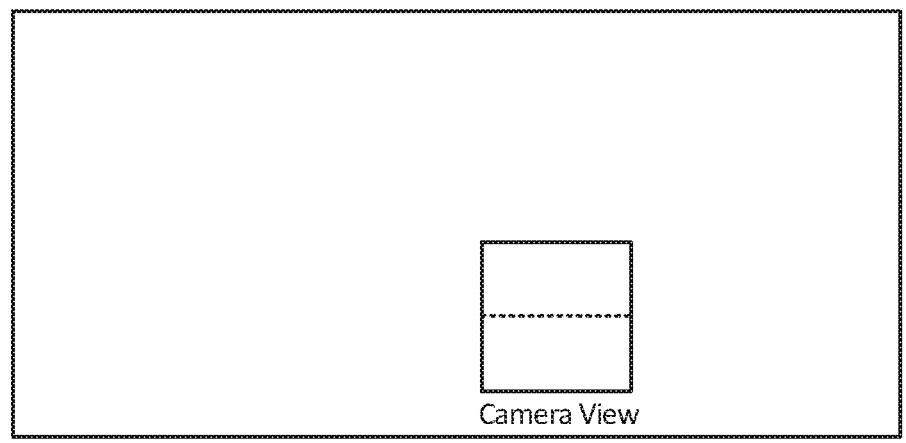

FIGS. 7A and 7B are schematic diagrams depicting light projector 28 projecting a pulse of linearly-patterned polarized light with a dashed encoding pattern. In FIGS. 7A and 7B, light projector 28 is shown projecting a pulse of linearly-patterned polarized light upon object 56. In the depicted scenario, no reference plane is present. A portion of the projected pulse of linearly-patterned polarized light is reflected by object 54 as indicated in reflected line 58. Reflected line 58 reveals a spatially encoded pattern of intensity. The encoding facilitates identification of a relative direction (e.g., an azimuthal and/or elevation angle) of the linearly-patterned polarized light within the projected light pulse as projected from light projector 28. In some embodiments, for example, dash lengths may monotonically increase from a minimum azimuthal direction to a maximum azimuthal direction. Thus, the imaged dash length may be indicative of the azimuthal direction associated with a particular dash segment.

Figure 8A:
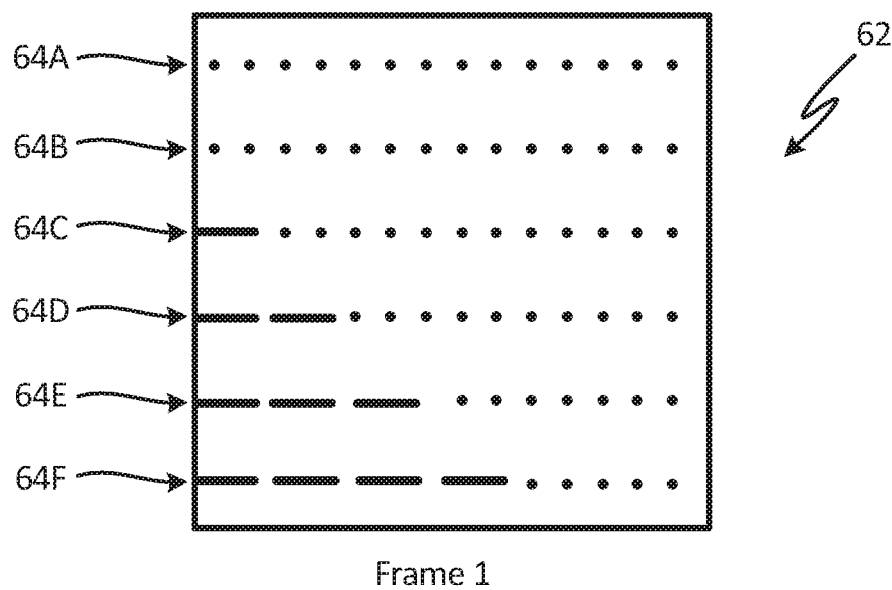
FIGS. 8A and 8B depict two frames from a sequence of selectively captured images depicting a sequence of encoded patterns projected from a light projector.
Figure 8B:
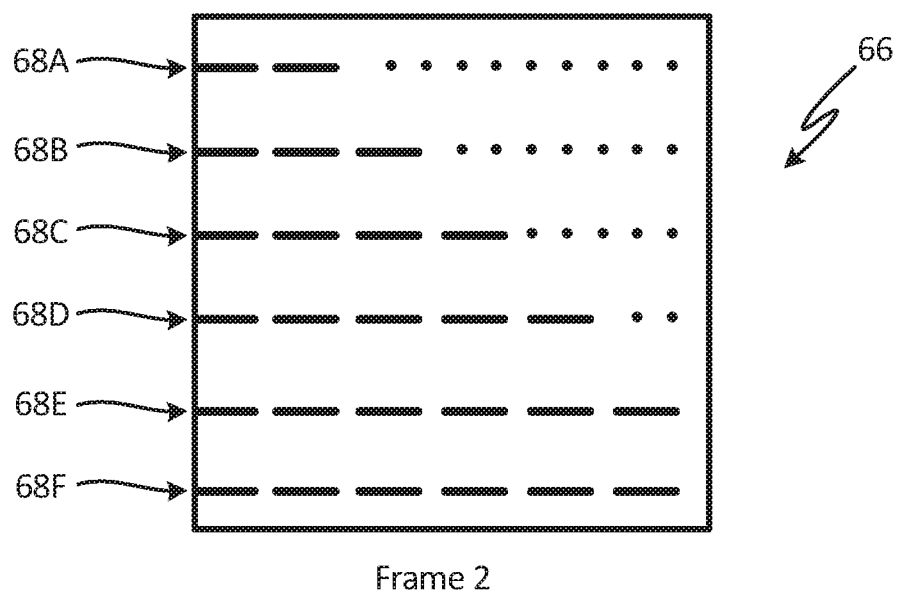

FIGS. 8A and 8B depict two frames from a sequence of selectively captured images depicting a sequence of encoded patterns projected from a light projector. In FIG. 8A, first two-dimensional image 62 is shown. First two-dimensional image 62 was obtained from a sequence of row images obtained. Each row image corresponds to a different elevation direction at which different pulses of linearly-patterned polarized light have been directed and synchronously imaged. Two-dimensional image 62 includes rows 64A-64F of image data upon which reflections of pulses of linearly-patterned polarized light have been focused. Each of rows 64A-64F of image data depicts a row image that is encoded with a different spatial pattern of light intensity encodings. Although rows 64A-64B of image data show encodings that are regular throughout, rows 64C-64F of image data provide encodings that have dash length variations. Such a sequence of encodings can facilitate the calculation of location(s) and/or range(s) of object(s) imaged.

In FIG. 8B, second two-dimensional image 66 is shown. Second two-dimensional image 66 was again obtained from a sequence of row images obtained. The sequence of the encodings are different, however, than those depicted in FIG. 6A. Each row image corresponds to a different elevation direction at which different pulses of linearly-patterned polarized light have been directed and synchronously imaged. Two-dimensional image 66 includes rows 68A-68F of image data upon which reflections of pulses of linearly-patterned polarized light have been focused. Each of rows 68A-68F of image data depicts a row image that is encoded with a different spatial pattern of light intensity encodings. Although rows 68E-68F of image data show encodings that are regular throughout, rows 64A-64E of image data provide encodings that have dash length variations. Thus, by varying the sequence of encoding, different row images can be used to provide data for use in calculating location(s) and/or range(s) of object(s) imaged. Thus, location(s) and/or range(s) of various portions of object(s) can be calculated, using such techniques.

Other encoding techniques can be used to facilitate the calculation of location(s) and/or range(s) of object(s) imaged. For example, a binary-coded sequence of linearly-patterned pulsed polarized light can be sequentially projected upon an object. A solid line, for example, can be projected upon the object. Then a dash that spans a first half of the line can be projected upon the object. Then a line having dashes in the first and third quarter of the line can be projected upon the object. Then a dashed line having dashes in the first third, fifth, and seventh eighths of the line can be projected upon the object. Such binary encoding can continue until a predetermined precision of range calculation is obtained. In other embodiments, a pseudo-random sequence of dashes can be projected. Image processor 36 can compare the captured row image with the pseudo-random sequence to calculate location(s) and/or range(s) of objects in the row image. In some embodiments, image processor 36 may identify locations that require further precision and send a signal to controller 34, the signal indicative of such regions. The controller can then direct light projector 28 to project pulsed of linearly-patterned polarized light in the directions corresponding to the signal.

Discussion of Possible Embodiments

The following are non-exclusive descriptions of possible embodiments of the present invention.

Apparatus and associated methods relate to a system for calculating location(s) and/or range(s) of object(s) in a scene external to a vehicle. The system includes a light projector, a polarizing filter, a camera, a controller and an image processor. The light projector is configured to be mounted at a projector location on the vehicle to project pulses of polarized light onto the scene. The polarizing filter is configured to pass light of a detection polarization state orthogonal to the specular-reflection polarization state and to block light of the specular-reflection polarization state, the specular-reflection polarization state being the polarization state of the projected pulses of polarized light reflected by specular objects. The camera has a two-dimensional array of light-sensitive pixels. The camera is configured to be mounted at a camera location on the vehicle to receive light passed through the polarizing filter so as to capture two-dimensional images of the scene. The controller is configured to coordinate the light projector and the camera so that the two-dimensional images of the scene include image data corresponding to a received portion of the projected pulses of polarized light reflected by the scene and passed through the polarizing filter. The image processor is configured to calculate, based on the projector location, the camera location, and the image data, locations(s) and/or range(s) of the object(s) in the scene.

The system of the preceding paragraph can optionally include, additionally and/or alternatively, any one or more of the following features, configurations and/or additional components:

A further embodiment of the foregoing system, wherein the image processor can be further configured to determine a subset of the two-dimensional array of pixels upon which the portion of the received portion of the projected pulses of light reflected by the scene and passed through the polarizing filter is focused.

A further embodiment of any of the foregoing systems, wherein the image data can include the determined subset, each of the determined subset has a pixel coordinate indicative of a reception angle of field of view from which the received portion of the projected pulses of light reflected by the scene and passed through the polarizing filter is received.

A further embodiment of any of the foregoing systems, wherein the image data can include a pixel coordinate(s) upon which the received portion of the projected pulses of polarized light reflected by the scene and passed through the polarizing filter is focused.

A further embodiment of any of the foregoing systems can further include a lens configured to collimate the pulses of polarized light projected in a collimated direction orthogonal to a direction of projection, and to diverge the light in a divergent direction orthogonal to both the collimated direction and the direction of projection.

A further embodiment of any of the foregoing systems, wherein the camera can be oriented such that the image data of the received portion of the collimated pulses of polarized light reflected by the scene and passed through the polarizing filter is imaged by a selected one of rows or columns of the two-dimensional array of light-sensitive pixels.

A further embodiment of any of the foregoing systems, wherein the projector location can be on a line along which one of the rows or columns of light-sensitive pixels is located.

A further embodiment of any of the foregoing systems, wherein the controller can be further configured to control an angular direction along which the pulses of light are projected. The line along which one of the rows or columns of light-sensitive pixels is located can define an angular control axis about which the angular direction along which the pulses of polarized light are projected.

A further embodiment of any of the foregoing systems, wherein the camera can be configured to form a first image while the light projector is projecting a pulse of light onto the scene.

A further embodiment of any of the foregoing systems, wherein the camera can be configured to form a second image while the light projector is not projecting a pulse of light onto the scene.

A further embodiment of any of the foregoing systems, wherein the image processor can be configured to generate a difference image based on a difference between the first and second images.

A further embodiment of any of the foregoing systems can further include a cockpit notification system configured to generate an alert signal if the calculated location(s) and/or range(s) of object(s) indicate that the object(s) are within a collision zone or on a collision trajectory.

A further embodiment of any of the foregoing systems, wherein the cockpit notification system can include an audible alarm that is activated when the calculated location(s) and/or range(s) of the object(s) indicates one or more of the object(s) in the scene has a combination of location(s) and/or ranges(s) relative to the vehicle corresponding to a risk of collision.

A further embodiment of any of the foregoing systems, wherein the cockpit notification system can include a display device configured to display a two-dimensional image of the scene annotated with the calculated location(s) and/or range(s) of object(s).

Some embodiments relate to a method for calculating location(s) and/or range(s) of object(s) in a scene external to a vehicle. The method includes projecting, via a light projector mounted at a projector location on the vehicle, pulses of polarized light onto the scene. The method includes polarizing, via a polarizing filter, a received portion of the projected pulses of polarized light reflected by the scene so as to block light of the specular-reflection polarization while passing light of a detection polarization state orthogonal to the specular-reflection polarization state. The specular-reflection polarization state being the polarization state of the projected pulses of polarized light reflected by specular objects. The method includes capturing, via a camera having a two-dimensional array of light-sensitive pixels, two-dimensional images of the scene. The camera is mounted at a camera location on the vehicle to receive light passed through the polarizing filter. The method includes coordinating, via a controller, the light projector and the camera so that the two-dimensional images of the scene include image data corresponding to a received portion of the projected pulses of polarized light reflected by the scene and passed through the polarizing filter. The method also includes calculating, via an image processor, locations(s)

and/or range(s) of object(s) in the scene based on the projector location, the camera location, and the image data, locations(s) and/or range(s) of the object(s) in the scene.

The method of the preceding paragraph can optionally include, additionally and/or alternatively, any one or more of the following features, configurations and/or additional components:

A further embodiment of the foregoing method can further include outputting an alert signal if the calculated location(s) and/or range(s) of object(s) indicates one or more of the object(s) in the scene has a combination of a location(s) and/or range(s) relative to the vehicle corresponding to a risk of collision.

A further embodiment of any of the foregoing methods can further include determining, via the image processor, a subset of the two-dimensional array of pixels upon which the portion of the received portion of the projected pulses of light reflected by the scene and passed through the polarizing filter is focused.

A further embodiment of any of the foregoing methods, wherein the image data can include the determined subset, each of the determined subset has a pixel coordinate indicative of a reception angle of field of view from which the received portion of the projected pulses of light reflected by the scene and passed the polarizing filter is received.

A further embodiment of any of the foregoing methods, wherein the image data can include the determined subset, each of the determined subset has a pixel coordinate indicative of a reception angle of field of view from which the received portion of the projected pulses of light reflected by the scene and passed through the polarizing filter is received.

A further embodiment of any of the foregoing methods can further include collimating, via a lens, the pulses of polarized light projected in a collimated direction orthogonal to a direction of projection. The method can also include diverging the light in a divergent direction orthogonal to both the collimated direction and the direction of projection.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for calculating location(s) and/or range(s) of object(s) in a scene external to a vehicle, the system comprising:
   a light projector configured to be mounted at a projector location on the vehicle to project pulses of polarized light onto the scene;
   a lens configured to collimate the pulses of polarized light projected in a collimated direction orthogonal to a direction of projection, and to diverge the pulses of polarized light in a divergent direction orthogonal to both the collimated direction and the direction of projection;
   a polarizing filter configured to pass light of a detection polarization state orthogonal to the specular-reflection polarization state and to block light of the specular-reflection polarization state, the specular-reflection polarization state being the polarization state of the projected pulses of polarized light reflected by specular objects;
   a camera having a two-dimensional array of light-sensitive pixels, the camera configured to be mounted at a camera location on the vehicle to receive light passed through the polarizing filter so as to capture two-dimensional images of the scene;
   a controller configured to coordinate the light projector and the camera so that the two-dimensional images of the scene include image data corresponding to a received portion of the projected pulses of polarized light reflected by the scene and passed through the polarizing filter; and
   an image processor configured to calculate, based on the projector location, the camera location, and the image data, locations(s) and/or range(s) of the object(s) in the scene.

2. The system of claim 1, wherein the image processor is further configured to determine a subset of the two-dimensional array of pixels upon which the portion of the received portion of the projected pulses of light reflected by the scene and passed through the polarizing filter is focused.

3. The system of claim 2, wherein the image data includes the determined subset, each of the determined subset has a pixel coordinate indicative of a reception angle of field of view from which the received portion of the projected pulses of light reflected by the scene and passed through the polarizing filter is received.

4. The system of claim 1, wherein the image data includes a pixel coordinate(s) upon which the received portion of the projected pulses of polarized light reflected by the scene and passed through the polarizing filter is focused.

5. The system of claim 1, wherein the camera is oriented such that the image data of the received portion of the collimated pulses of polarized light reflected by the scene and passed through the polarizing filter is imaged by a selected one of rows or columns of the two-dimensional array of light-sensitive pixels.

6. The system of claim 5, wherein the projector location is on a line along which one of the rows or columns of light-sensitive pixels is located.

7. The system of claim 6, wherein the controller is further configured to control an angular direction along which the pulses of light are projected, wherein the line along which one of the rows or columns of light-sensitive pixels is located defines an angular control axis about which the angular direction along which the pulses of polarized light are projected.

8. The system of claim 1, wherein the camera is configured to form a first image while the light projector is projecting a pulse of light onto the scene.

9. The system of claim 8, wherein the camera is configured to form a second image while the light projector is not projecting a pulse of light onto the scene.

10. The system of claim 9, wherein the image processor is configured to generate a difference image based on a difference between the first and second images.

11. The system of claim 1, further comprising a cockpit notification system configured to generate an alert signal if the calculated location(s) and/or range(s) of object(s) indicate that the object(s) are within a collision zone or on a collision trajectory.

12. The system of claim 11, wherein the cockpit notification system includes an audible alarm that is activated when the calculated location(s) and/or range(s) of the object(s) indicates one or more of the object(s) in the scene has a combination of location(s) and/or ranges(s) relative to the vehicle corresponding to a risk of collision.

13. The system of claim 11, wherein the cockpit notification system includes a display device configured to display a two-dimensional image of the scene annotated with the calculated location(s) and/or range(s) of object(s).

14. A method for calculating location(s) and/or range(s) of object(s) in a scene external to a vehicle, the method comprising:
projecting, via a light projector mounted at a projector location on the vehicle, pulses of polarized light onto the scene;
collimating, via a lens, the pulses of polarized light projected in a collimated direction orthogonal to a direction of projection;
diverging the pulses of polarized light in a divergent direction orthogonal to both the collimated direction and the direction of projection;
polarizing, via a polarizing filter, a received portion of the projected pulses of polarized light reflected by the scene so as to block light of the specular-reflection polarization while passed light of a detection polarization state orthogonal to the specular-reflection polarization state, the specular-reflection polarization state being the polarization state of the projected pulses of polarized light reflected by specular objects;
capturing, via a camera having a two-dimensional array of light-sensitive pixels, two-dimensional images of the scene, the camera mounted at a camera location on the vehicle to receive light passed through the polarizing filter;
coordinating, via a controller, the light projector and the camera so that the two-dimensional images of the scene include image data corresponding to a received portion of the projected pulses of polarized light reflected by the scene and passed through the polarizing filter; and
calculating, via an image processor, locations(s) and/or range(s) of object(s) in the scene based on the projector location, the camera location, and the image data, locations(s) and/or range(s) of the object(s) in the scene.

15. The method of claim 14, further comprising:
outputting an alert signal if the calculated location(s) and/or range(s) of object(s) indicates one or more of the object(s) in the scene has a combination of a location(s) and/or range(s) relative to the vehicle corresponding to a risk of collision.

16. The method of claim 14, further comprising:
determining, via the image processor, a subset of the two-dimensional array of pixels upon which the portion of the received portion of the projected pulses of light reflected by the scene and passed through the polarizing filter is focused.

17. The method of claim 16, wherein the image data includes the determined subset, each of the determined subset has a pixel coordinate indicative of a reception angle of field of view from which the received portion of the projected pulses of light reflected by the scene and passed through the polarizing filter is received.

18. The method of claim 14, wherein the image data includes a pixel coordinate(s) upon which the received portion of the projected pulses of polarized light reflected by the scene and passed through the polarizing filter is focused.

* * * * *